(12) United States Patent
Fujita et al.

(10) Patent No.: US 9,385,389 B2
(45) Date of Patent: Jul. 5, 2016

(54) FUEL CELL

(75) Inventors: Goro Fujita, Osaka (JP); Hiroaki Suzuki, Hyogo (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 277 days.

(21) Appl. No.: 14/112,753

(22) PCT Filed: May 16, 2012

(86) PCT No.: PCT/JP2012/003199
§ 371 (c)(1),
(2), (4) Date: Oct. 18, 2013

(87) PCT Pub. No.: WO2012/160779
PCT Pub. Date: Nov. 29, 2012

(65) Prior Publication Data
US 2014/0038079 A1    Feb. 6, 2014

(30) Foreign Application Priority Data

May 20, 2011    (JP) .................................. 2011-113545

(51) Int. Cl.
*H01M 8/10*    (2006.01)
(52) U.S. Cl.
CPC .......... *H01M 8/1065* (2013.01); *H01M 8/1067* (2013.01); *Y02E 60/521* (2013.01)
(58) Field of Classification Search
CPC .... H01M 8/10; H01M 8/1065; H01M 8/1067

USPC .......................................................... 429/482
See application file for complete search history.

(56) References Cited

FOREIGN PATENT DOCUMENTS

| JP | 10-312815 A | 11/1998 | |
|---|---|---|---|
| JP | 2005-174620 A | 6/2005 | |
| JP | 2005-174770 A | 6/2005 | |
| JP | 2006-252967 A | 9/2006 | |
| JP | 2006-331720 A | 12/2006 | |
| JP | 2006331720 A * | 12/2006 | .............. H01M 8/02 |

OTHER PUBLICATIONS

International Search Report dated Jul. 10, 2012, issued in corresponding application numbner PCT/JP2012/003199.

* cited by examiner

*Primary Examiner* — Karie O'Neill Apicella
(74) *Attorney, Agent, or Firm* — Westerman, Hattori, Daniels & Adrian, LLP (57) ABSTRACT

An electrolyte membrane 22 constituting a membrane electrode assembly includes thick portions 23 having a relatively large thickness. The thick portions 23 have a strip shape and are disposed at a predetermined distance from each other along the electric conduction direction. The thick portions 23 extend from one side L1 of the electrolyte membrane 22 extending in a direction perpendicular to the electric conduction direction to the other side L2 of the electrolyte membrane 22 extending in the direction perpendicular to the electric conduction direction. The thick portions 23 have a convex shape with respect to the anode side surface and the cathode side surface of the electrolyte membrane 22.

11 Claims, 12 Drawing Sheets

FUEL CELL

TECHNICAL FIELD

The present invention relates to a fuel cell.

BACKGROUND ART

Fuel cells are devices that generate electrical energy from hydrogen and oxygen and can achieve high electricity generation efficiency. The main features of fuel cells are that high electricity generation efficiency can be expected even on a small scale because electricity is directly generated without undergoing a stage of heat energy or kinetic energy unlike conventional electricity generation methods, and they have good environmental properties because of small amounts of emission of nitrogen compounds and the like and low noise and vibration. That is, fuel cells can effectively use chemical energy possessed by fuel and have environmentally friendly properties. Therefore, it is expected that fuel cells will be used as energy supply systems that will have a major role in the 21st century, and will receive attention as new promising electricity generation systems that can be used in various applications from large-scale electricity generation to small-scale electricity generation, e.g., for use in space, automobiles, and mobile devices. In order to put fuel cells into practical use, technological development is underway in earnest.

Among various types of fuel cells, a solid polymer-type fuel cell has a feature that it has a lower operating temperature and a higher power density, and in particular, in recent years, it has been expected to use it as a power source for mobile devices (e.g., mobile phones, notebook computers, PDAs, MP3 players, digital cameras, electronic dictionaries, and electronic books) and the like. As a solid polymer-type fuel cell for mobile devices, a fuel cell of flat arrangement type is known in which a plurality of unit cells are arranged in a planar manner. Regarding the fuel cell of flat arrangement type, a configuration is known in which current-collecting members for achieving conduction between electrodes (anodes and cathodes) of unit cells are disposed, not on the exposed surfaces of the electrodes, but on the periphery of the electrodes.

CITATION LIST

Patent Literature

PTL 1: Japanese Published Unexamined Patent Application No. 10-312815
PTL 2: Japanese Published Unexamined Patent Application No. 2006-252967

SUMMARY OF INVENTION

Technical Problem

In the fuel cell having such a configuration, when the electrolyte is deformed because of, for example, swelling of the electrolyte caused by water generation in association with electrochemical reactions, cracks occur in the electrodes, resulting in a degradation in the conductivity of the electrodes, which is a problem. In order to prevent cracks from occurring in electrodes, a technique is known in which by incorporating a reinforcing material that does not contribute to electricity generation into an electrolyte membrane, deformation of the electrolyte membrane is prevented (refer to Patent Literatures 1 and 2). However, when prevention of deformation of the electrolyte is intended using the reinforcing material that does not contribute to electricity generation, the electric resistance is increased by the reinforcing material, resulting in a degradation of the electricity generation performance of the cell, which is a new problem.

The present invention has been achieved in view of the problems described above, and it is an object of the present invention to provide a technique capable of suppressing a degradation in the conductivity of electrodes without impairing the electricity generation performance of a fuel cell.

Solution to Problem

According to an embodiment of the present invention, there is provided a fuel cell including a membrane electrode assembly which includes an electrolyte membrane, an anode provided on one surface of the electrolyte membrane, and a cathode provided on another surface of the electrolyte membrane, and a current-collecting portion provided on a periphery of the membrane electrode assembly, characterized in that the electrolyte membrane includes thick portions having a relatively large thickness, and formation of cracks in at least one of two electrodes, the anode and cathode, is controlled by the thick portions such that the sum of lengths of components of individual cracks in an electric conduction direction toward the current-collecting portion on the electrolyte membrane is larger than the sum of lengths of components of individual cracks in a direction perpendicular to the electric conduction direction.

In the fuel cell according to this embodiment, deformation of the electrolyte membrane is suppressed by the thick portions provided in the electrolyte membrane, and cracks occurring in the electrodes are controlled such that they are formed in the electric conduction direction in regions between the adjacent thick portions. Consequently, cracks in the direction perpendicular to the electric conduction direction are suppressed from propagating in the electrodes, and thus it is possible to more reliably secure the conduction path in the electric conduction direction.

In the fuel cell according to the embodiment, the thick portions and regions other than the thick portions may be disposed alternately in a direction perpendicular to the electric conduction direction on the electrolyte membrane in the plane of the electrolyte membrane. In an area where the thick portions and the regions other than the thick portions are alternately disposed in the direction perpendicular to the electric conduction direction on the electrolyte membrane in the plane of the electrolyte membrane, the maximum value $Q$ of the continuous length of the regions other than the thick portions on a line perpendicular to the electric conduction direction may be smaller than the length $P$ of the electrolyte membrane in the electric conduction direction. In the plane of the electrolyte membrane, the maximum value $R$ of the continuous length of the thick portions on a line perpendicular to the electric conduction direction may be smaller than the maximum value $Q$. In the plane of the electrolyte membrane, the thick portions may be disposed at a distance from either end in the electric conduction direction, and the maximum value $S$ of the distance between the thick portion and the either end may be smaller than the smaller of the maximum value $Q$ and $\frac{1}{3}$ of the length $P$ of the electrolyte membrane in the electric conduction direction.

It is to be understood that any appropriate combination of the elements described above can be within the scope of the invention for which protection by the patent is sought by the present patent application.

Advantageous Effects of Invention

According to the present invention, it is possible to suppress a degradation in the conductivity of electrodes without impairing the electricity generation performance of a fuel cell.

DESCRIPTION OF EMBODIMENTS

Embodiments of the present invention will be described below with reference to the drawings. In all of the drawings, the same structural elements are denoted by the same reference signs, and description thereof will be appropriately omitted.

First Embodiment

Figure 1:
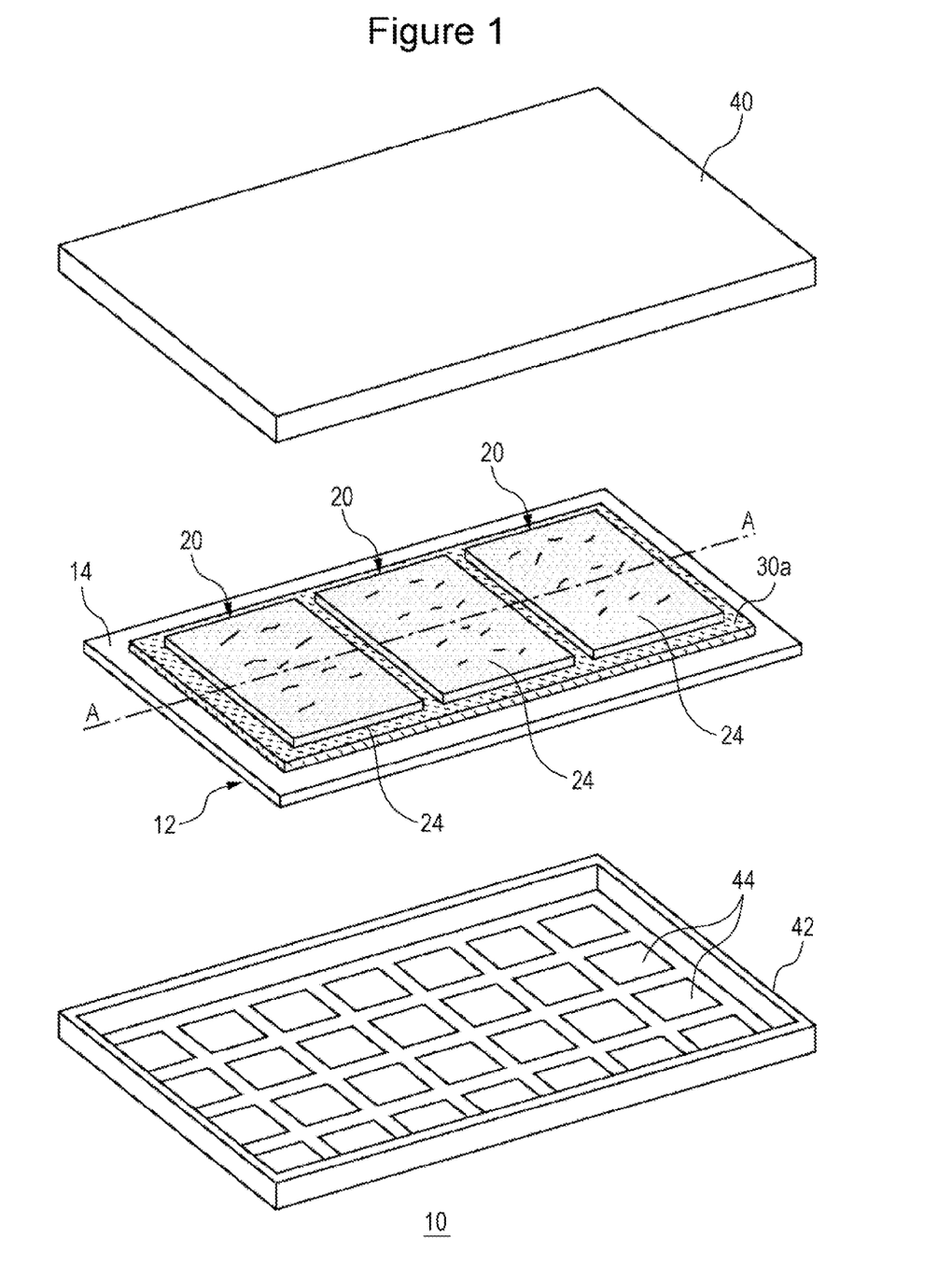
FIG. 1 is an exploded perspective view showing a structure of a fuel cell according to a first embodiment.
Figure 2:
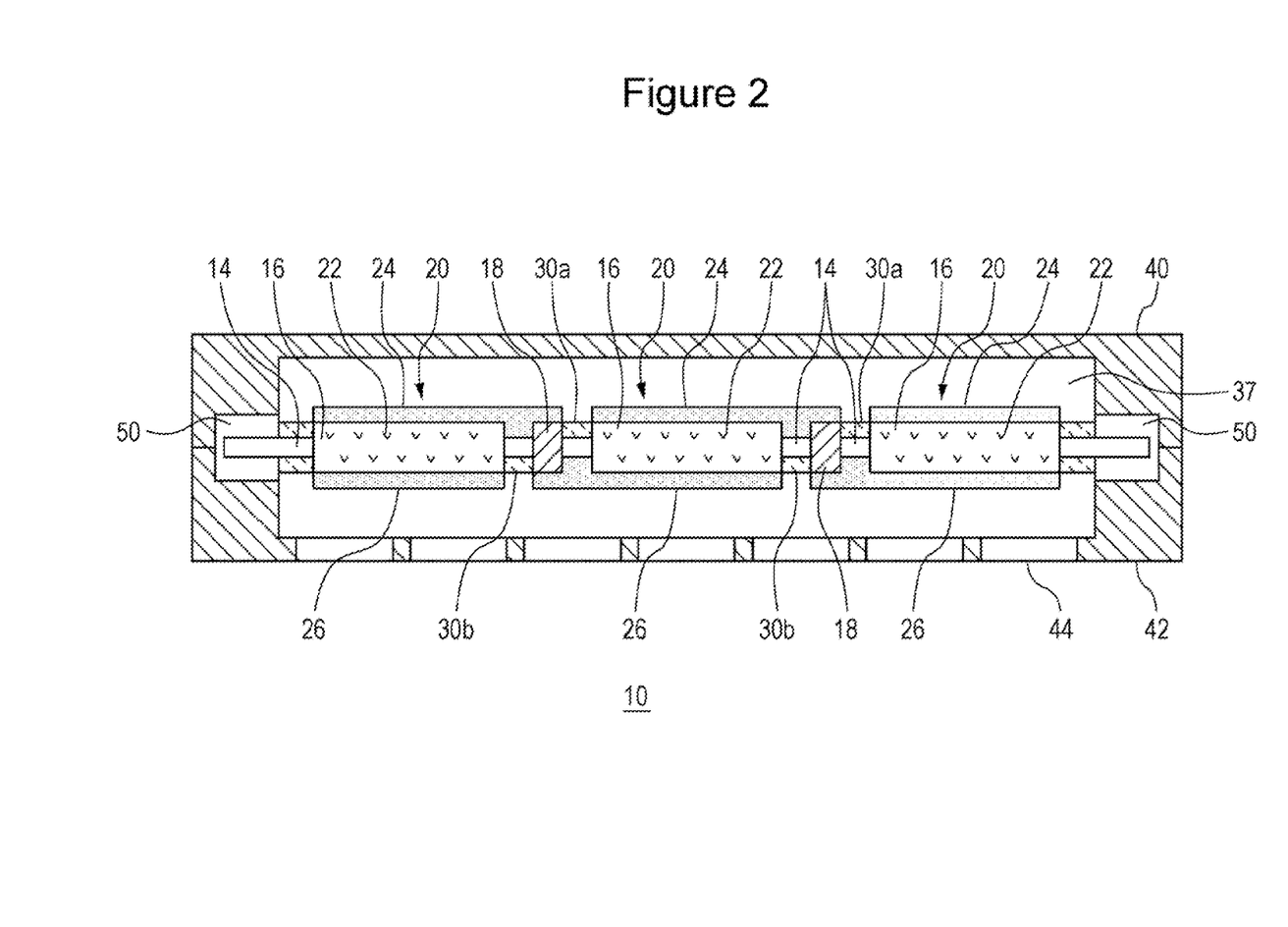
FIG. 2 is a cross-sectional view of the fuel cell taken along the line A-A of FIG. 1.

FIG. 1 is an exploded perspective view showing a structure of a fuel cell according to a first embodiment. FIG. 2 is a cross-sectional view taken along the line A-A of FIG. 1. As shown in FIGS. 1 and 2, a fuel cell 10 includes a composite membrane 12 into which membrane electrode assemblies (MEAs, also referred to as catalyst coated proton-exchange membranes (CCMs)) 20 are incorporated, an anode housing 40, and a cathode housing 42. A sealing member 50, which will be described later, is provided on a periphery of the composite membrane 12.

The composite membrane 12 includes a substrate 14 and a plurality of membrane electrode assemblies 20. The substrate 14 is composed of an insulating material, such as a polyacrylate. The substrate 14 has openings 16 in the same number as the number of the membrane electrode assemblies 20.

Each membrane electrode assembly 20 includes an electrolyte membrane 22, an anode catalyst layer 24 provided on one surface of the electrolyte membrane 22, and a cathode catalyst layer 26 provided on another surface of the electrolyte membrane 22. The electrolyte membranes 22 are disposed so as to fill the openings 16 in the substrate 14. Hydrogen is supplied as a fuel gas to the anode catalyst layer 24. On the other hand, air is supplied as an oxidant to the cathode catalyst layer 26. Each electrolyte membrane 22 is held between a pair of anode catalyst layer 24 and cathode catalyst layer 26 to constitute a cell. Each cell generates electricity through an electrochemical reaction between hydrogen and oxygen in the air.

As described above, in the fuel cell according to this embodiment, a plurality of cells, each including a pair of anode catalyst layer 24 and cathode catalyst layer 26, are arranged in a planar manner.

In this embodiment, interconnectors (current-collecting members) 18 are provided on the periphery of the membrane electrode assemblies 20. The principal surfaces of the anode catalyst layers 24 on the side opposite to the electrolyte membranes 22 and the cathode catalyst layers 26 on the side opposite to the electrolyte membranes 22 are exposed without being covered with the interconnectors 18. Specifically, an interconnector 18 is provided between two adjacent membrane electrode assemblies 20 so as to penetrate the substrate 14. In two adjacent cells, the anode catalyst layer 24 covering the electrolyte membrane 22 of one cell extends toward an interconnector 18, covers the substrate 14 between the interconnector 18 and the electrolyte membrane 22 of the one cell, and is connected to the interconnector 18. Furthermore, in the two adjacent cells, the cathode catalyst layer 26 covering the electrolyte membrane 22 of the other cell extends toward the interconnector 18, covers the substrate 14 between the interconnector 18 and the electrolyte membrane 22 of the other cell, and is connected to the interconnector 18. The interconnectors 18 are composed of a conductive material, and for example, carbon or the like is used. By employing the configuration described above, the adjacent cells are connected together in series by the interconnectors 18.

Note that the direction of electric current flowing in the cathode catalyst layer 26 toward the interconnector 18 and the direction of electric current flowing from the interconnector 18 toward the anode catalyst layer 24 are each referred to as the "electric conduction direction".

The electrolyte membrane 22, which preferably has good ion conductivity in a wet state, functions as an ion-exchange membrane that transfers protons between the anode catalyst layer 24 and the cathode catalyst layer 26. The electrolyte membrane 22 is composed of a solid polymer material, such as a fluorine-containing polymer or a fluorine-free polymer. For example, a sulfonic acid type perfluorocarbon polymer, a polysulfone resin, a perfluorocarbon polymer having a phosphonic acid group or a carboxylic acid group, or the like can be used. Examples of the sulfonic acid type perfluorocarbon polymer include Nafion (manufactured by DuPont: registered trademark) 112. Examples of the fluorine-free polymer include sulfonated aromatic polyether ether ketone and polysulfone.

Figure 3:
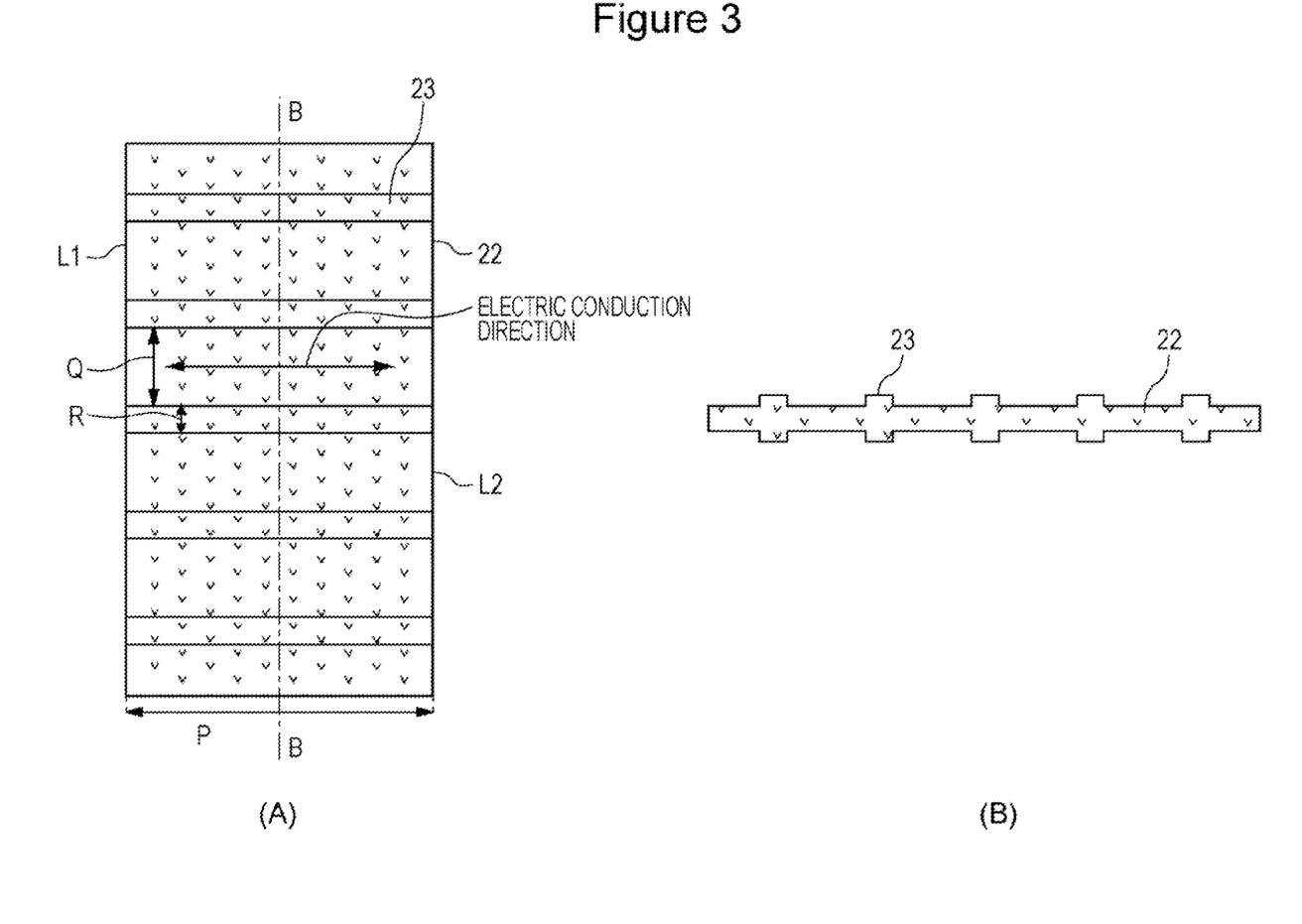
FIG. 3(A) is a plan view showing a structure of an electrolyte membrane 22.
FIG. 3(B) is a cross-sectional view taken along the line B-B of FIG. 3(A).

FIG. 3(A) is a plan view showing a structure of an electrolyte membrane 22, and FIG. 3(B) is a cross-sectional view taken along the line B-B of FIG. 3(A). The electrolyte membrane 22 has a partially different thickness and has thick portions 23 having a relatively large thickness. In this embodiment, the thick portions 23 have a strip shape and are disposed at a predetermined distance from each other along the electric conduction direction. The thick portions 23 extend from one side L1 of the electrolyte membrane 22 extending in a direction perpendicular to the electric conduction direction to the other side L2 of the electrolyte membrane 22 extending in the direction perpendicular to the electric conduction direction. The thick portions 23 have a convex shape with respect to the anode side surface and the cathode side surface of the electrolyte membrane 22. The thickness of the thick portions 23 is, for example, 30 to 50 μm, and the thickness of the regions of the electrolyte membrane 22 other than the thick portions 23 is, for example, 15 to 30 μm. The thickness of the electrolyte membrane 22 is set at an optimum thickness for demonstrating the performance of the fuel cell. The thickness of the thick portions 23 is set larger than that of the electrolyte membrane 22 within a range that does not significantly impair the performance of the fuel cell.

In the plane of the electrolyte membrane 22, the maximum value Q of the continuous length of the regions other than the thick portions 23 on a line perpendicular to the electric conduction direction is smaller than the length P of the electrolyte membrane 22 in the electric conduction direction (P/Q>1). In this embodiment, in the case where the distance between the thick portions 23 is uniform, the maximum value Q corresponds to the distance between two adjacent thick portions 23. In the case where the distance between the thick portions 23 varies, the maximum value Q corresponds to the maximum distance between the adjacent thick portions 23. Furthermore, the maximum value R of the continuous width of the thick portions 23 on a line perpendicular to the electric conduction direction is smaller than the maximum value Q (Q/R>1). In the case where the thick portions 23 have a uniform width, the maximum value R corresponds to the width of the thick portions 23. In the case where the thick portions 23 have a non-uniform width, the maximum value R corresponds to the maximum width of the thick portions 23.

Referring back to FIGS. 1 and 2, the anode catalyst layer 24 and the cathode catalyst layer 26 each contain an ion-exchange resin, catalyst particles, and in some cases carbon particles.

The ion-exchange resin contained in each of the anode catalyst layer 24 and the cathode catalyst layer 26 plays a role of connecting the catalyst particles with the electrolyte membrane 22 to allow the transfer of protons between the two. The ion-exchange resin may be composed of a polymer material similar to that of the electrolyte membrane 22. The catalyst metal may be a single element or an alloy of two or more elements selected from Sc, Y, Ti, Zr, V, Nb, Fe, Co, Ni, Ru, Rh, Pd, Pt, Os, Ir, lanthanoid series elements, and actinoid series elements. Furthermore, in the case where the catalyst is supported, acetylene black, ketjen black, carbon nanotubes, or the like may be used as carbon particles.

Figure 4:
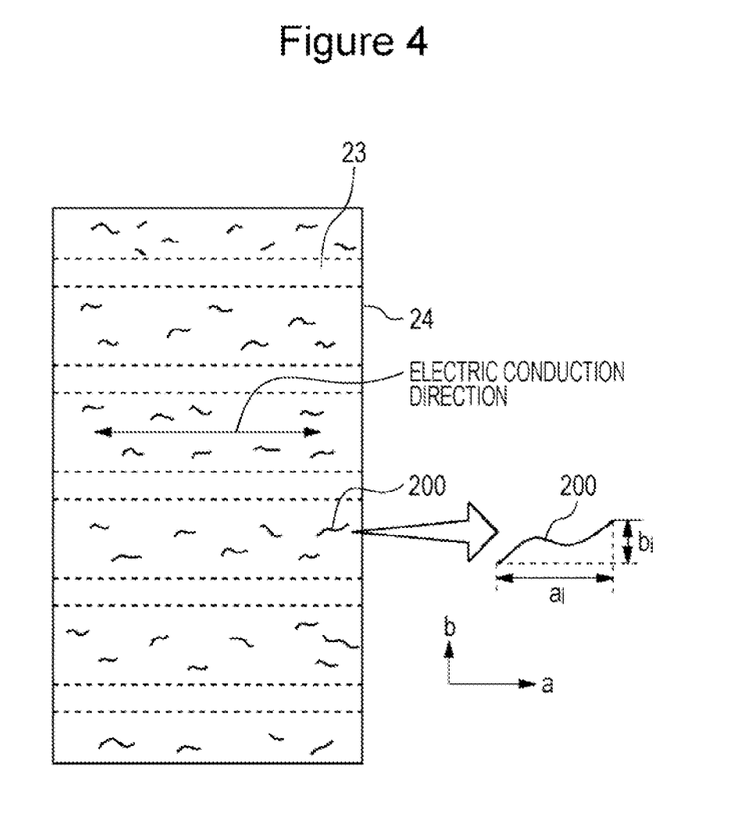
FIG. 4 is a plan view showing the direction in which cracks occur in a catalyst layer according to the first embodiment.

As exemplified in FIG. 4, since deformation of the electrolyte membrane is suppressed in thick portions 23, cracks 200 occurring in the anode catalyst layer 24 are controlled such that they are formed in the electric conduction direction in regions between adjacent thick portions 23. Consequently, the relationship $\Sigma a_i > \Sigma b_i$ is satisfied, where $a_i$ is the component in the electric conduction direction of each crack 200 formed in the anode catalyst layer 24, and $b_i$ is the component in a direction perpendicular to the electric conduction direction of each crack 200 formed in the anode catalyst layer 24. Furthermore, although not shown in the drawing, regarding cracks occurring in the cathode catalyst layer 26, the relationship $\Sigma a_i > \Sigma b_i$ is satisfied as in the anode catalyst layer 24.

Note that in the ion-exchange resin contained in each of the anode catalyst layer 24 and the cathode catalyst layer 26, the number of C—F bonds thereof may be smaller than that of the resin contained in the substrate 14, for example, as in the case of a hydrocarbon-based ion-exchange resin.

The anode housing 40 constitutes a fuel storage 37 for storing the fuel. By forming a fuel supply port (not shown) in the anode housing 40, the fuel can be supplied appropriately from a fuel cartridge or the like.

On the other hand, the cathode housing 42 is provided with air inlets 44 for feeding air from the outside.

The anode housing 40 and the cathode housing 42 are fastened to each other by fasteners (not shown), such as bolts and nuts, with a sealing member 50 provided on the periphery of the composite membrane 12. Thereby, a pressure is applied to the sealing member 50 to enhance the sealing performance of the sealing member 50.

In the composite membrane 12 according to this embodiment, an insulating protective layer 30a is provided around the anode catalyst layers 24, in particular, on the substrate 14 between the adjacent anode catalyst layers 24. A protective layer 30b is also provided around the cathode catalyst layers 26, in particular on the substrate 14 between the adjacent cathode catalyst layers 26. Hereinafter, the protective layers 30a and 30b may be collectively referred to as a "protective layer 30". For example, polyimide, Nafion, or the like may be used as the protective layer 30.

The protective layer 30 enhances the insulating property between the adjacent electrode assemblies 20. As a result, even if the distance between the adjacent membrane electrode assemblies 20, namely, the distance between the adjacent cells, is decreased, the occurrence of short-circuiting between the adjacent cells is suppressed.

In the fuel cell according to this embodiment, by providing the anisotropic thick portions 23 described above in the electrolyte membrane 22, deformation of the electrolyte membrane 22 is suppressed. Therefore, cracks occurring in the electrodes are controlled such that they are formed in the electric conduction direction in regions between the adjacent thick portions 23. In other words, cracks having anisotropy, in which the ratio of the length in the electric conduction direction is larger than the ratio of the length in the direction perpendicular to the electric conduction direction, are formed. Consequently, without using a member that does not contribute to electricity generation, cracks in the direction perpendicular to the electric conduction direction are suppressed from propagating in the electrodes, and thus it is possible to more reliably secure the conduction path in the electric conduction direction.

(Fabrication Method of Composite Membrane)

A method for fabricating a composite membrane 12 used in a fuel cell according to the first embodiment will be described with reference to FIGS. 5 to 10. FIGS. 5 to 10 are process diagrams showing a method for fabricating the composite membrane 12 according to the first embodiment. In FIGS. 5 to 10, the diagrams on the left side (i) are plan views, and the diagrams on the right side (ii) are cross-sectional views taken along the line A-A of the plan views.

Figure 5:
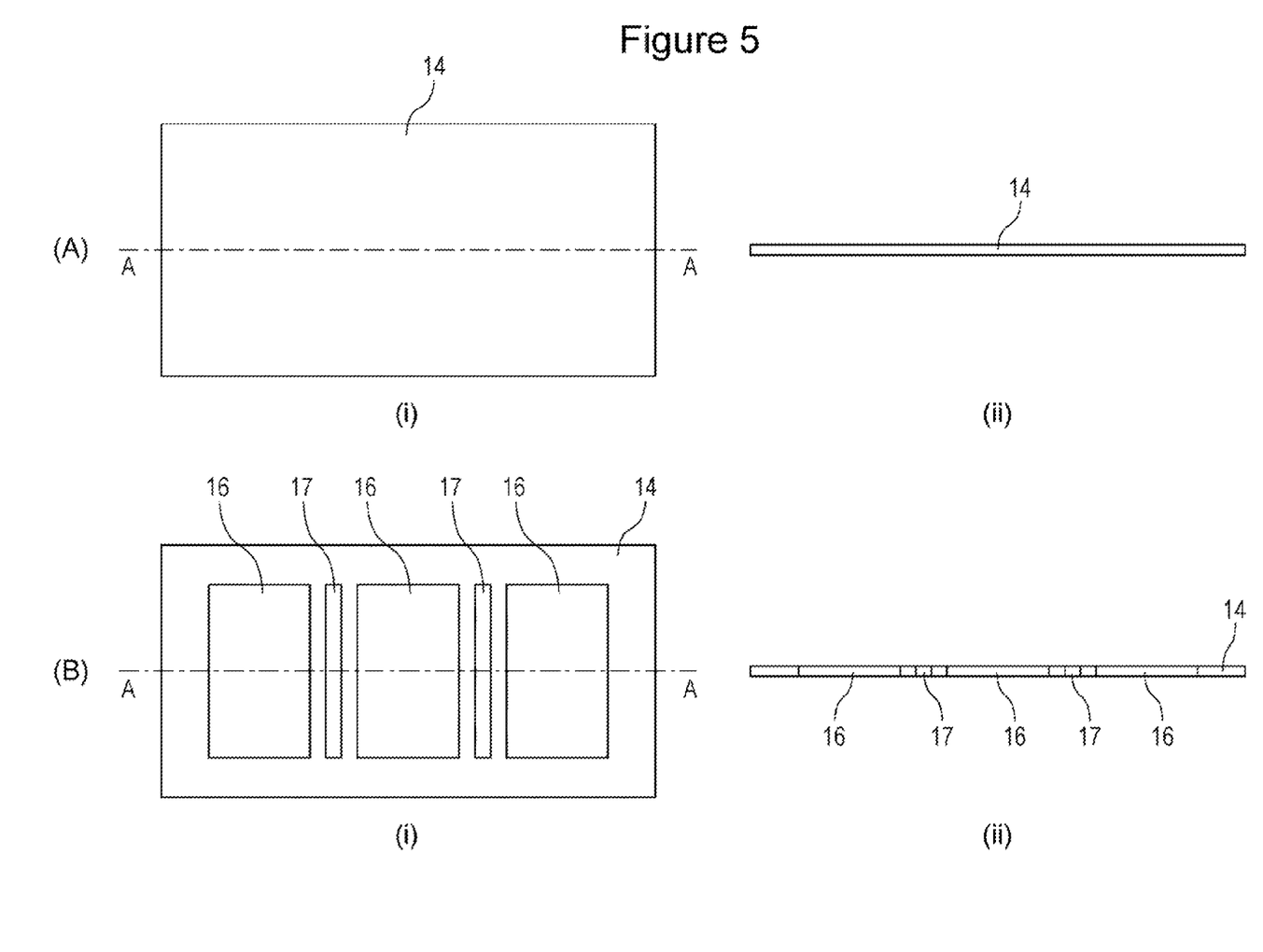
FIG. 5 is a process diagram showing a method for fabricating a composite membrane used in a fuel cell according to the first embodiment.

First, as shown in FIG. 5(A), a substrate 14 is prepared. The thickness of the substrate 14 is 20 to 150 μm. For example, a polyacrylate may be used for the substrate 14.

Next, as shown in FIG. 5(B), a plurality of openings 16 and 17 are formed in the substrate. Each opening 17 is formed between two adjacent openings 16. The distance between the opening 16 and the opening 17 is 500 μm or less. The openings 16 and 17 may be formed, for example, by laser processing using infrared laser, visible-light laser, or ultraviolet laser, a punching method using a metal die, or the like.

Figure 6:
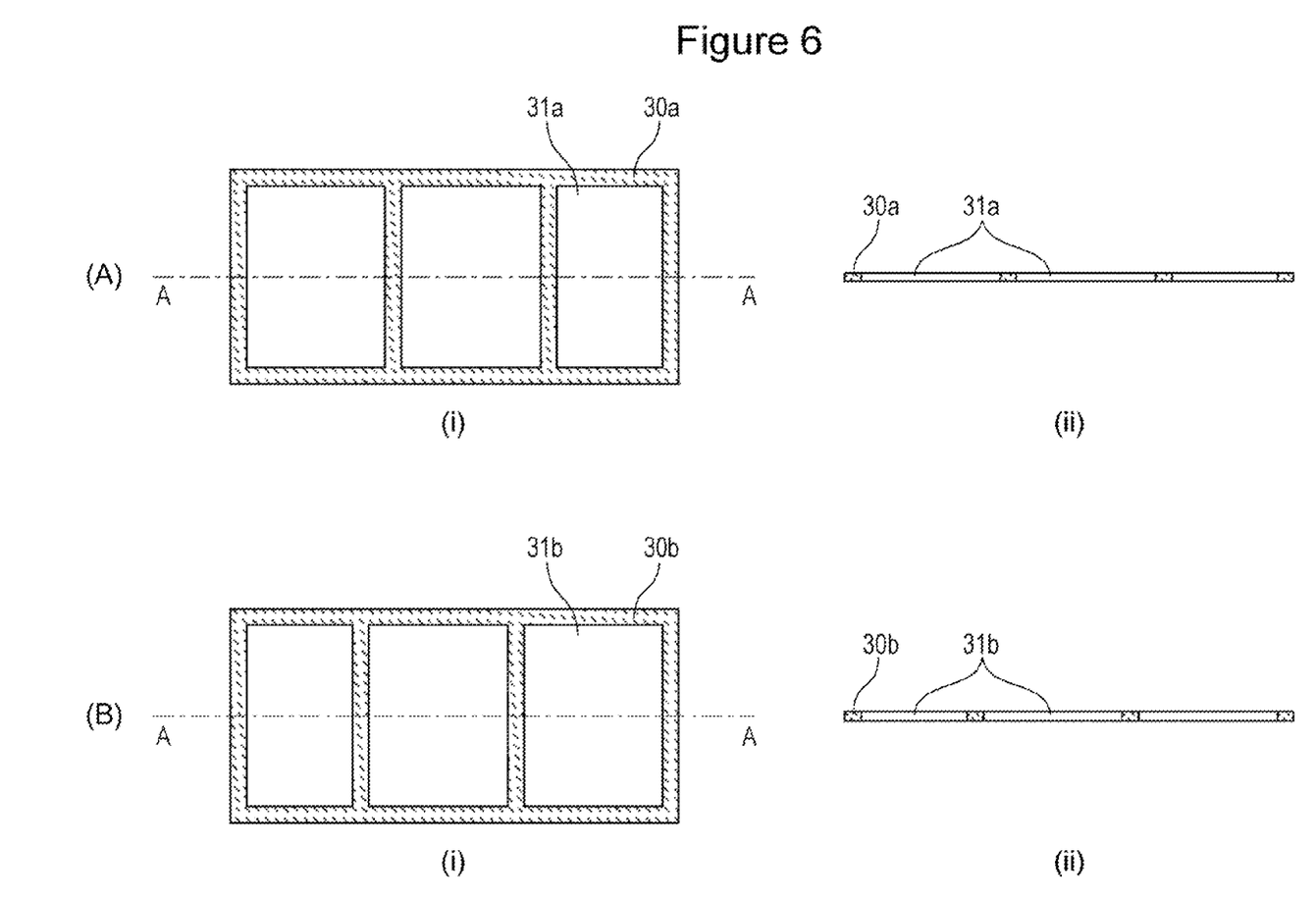
FIG. 6 is a process diagram showing a method for fabricating a composite membrane used in a fuel cell according to the first embodiment.

Along with the preparation of the substrate 14, as shown in FIGS. 6(A) and 6(B), a protective layer 30a and a protective layer 30b are prepared. The protective layer 30a has openings 31a corresponding to regions where anode catalyst layers are to be formed. On the other hand, the protective layer 30b has openings 31b corresponding to regions where cathodes are to be formed. The protective layers 30a and 30b may be fabricated, for example, by a method in which openings are formed in a sheet-like protective layer using laser or a metal die. The protective layers 30a and 30b preferably have a shield property against laser used in the laser processing, which will be described later, heat resistance, and thermal conductivity. Examples of the material for the protective layers 30a and 30b include a phenolic resin, polyimide, and cellulose.

Figure 7:
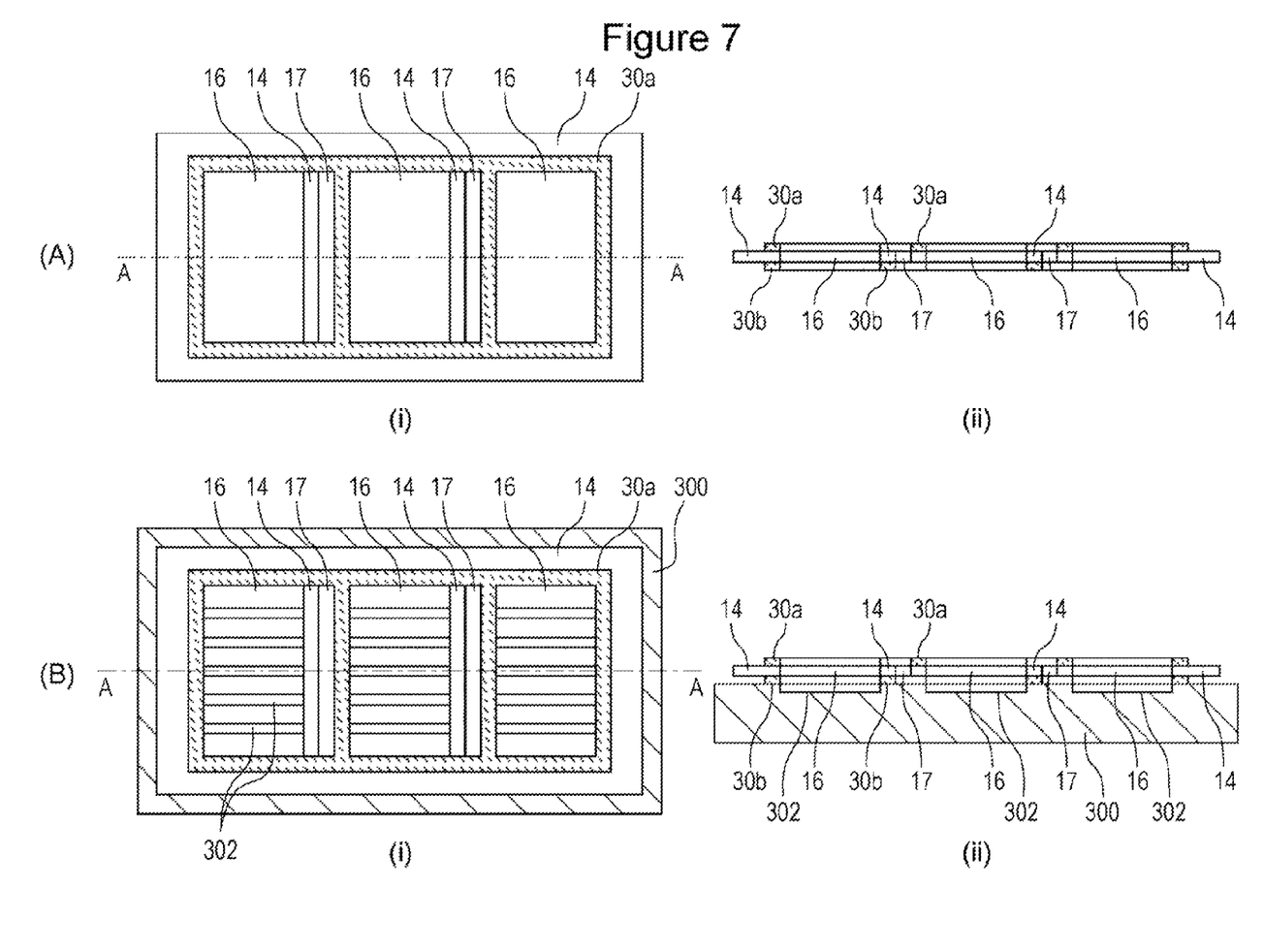
FIG. 7 is a process diagram showing a method for fabricating a composite membrane used in a fuel cell according to the first embodiment.

Next, as shown in FIG. 7(A), the protective layer 30a is overlaid on one surface of the substrate 14 (on an anode-forming side), and the protective layer 30b is overlaid on another surface of the substrate 14 (on a cathode-forming side). Then, the protective layers 30a and 30b are bonded to the substrate 14 using a hot press or the like. Although, in this fabrication method, a procedure is used in which the protective layer 30 in which openings have been formed in advance is attached to the substrate 14, a procedure may be applicable in which a resin serving as a material for the protective layer is applied to the substrate 14 by a spraying method or the like, using a mask having openings corresponding to regions where the protective layer 30 is to be formed.

Next, as shown in FIG. 7(B), a base 300 provided with grooves 302 in a pattern corresponding to thick portions 23 of electrolyte membranes 22 is prepared, and the substrate 14 is aligned with and placed on a predetermined region of the base 300.

Figure 8:
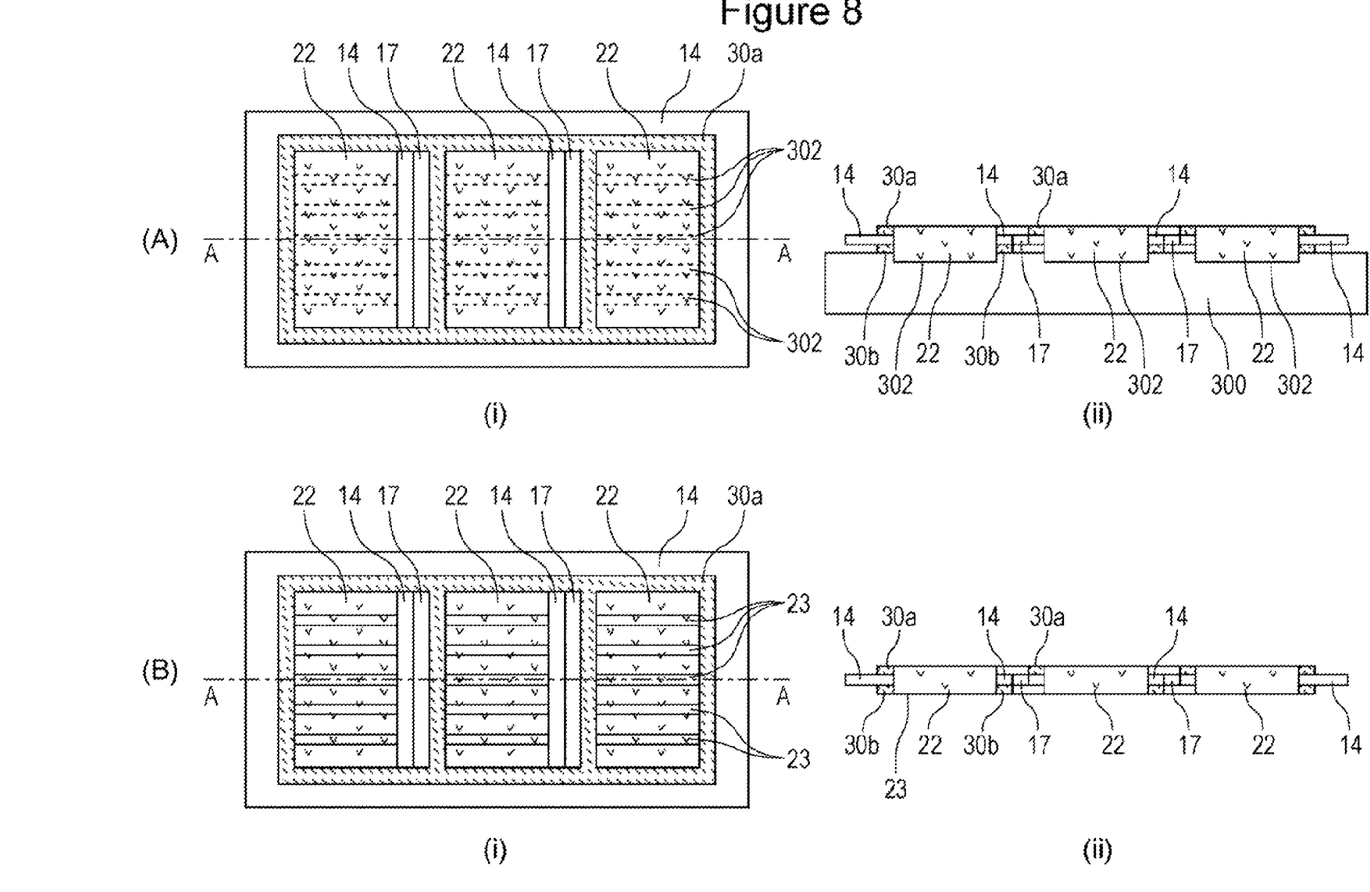
FIG. 8 is a process diagram showing a method for fabricating a composite membrane used in a fuel cell according to the first embodiment.

Next, as shown in FIG. 8(A), electrolyte membranes 22 are formed in the openings 16 (refer to FIG. 7(A)) provided in the substrate 14. Specifically, the openings 16 are filled with a Nafion solution. In this step, the grooves 302 formed in the base 300 are also filled with the Nafion solution.

Next, as shown in FIG. 8(B), by evaporating the solvent, the electrolyte membranes 22 having thick portions 23 are formed. In the process in which the solvent is evaporated, since surface tension acts on the Nafion solution, the thick portions 23 have a convex shape with respect to principal surfaces on both sides or the principal surface on one side of each electrolyte membrane 22.

Figure 9:
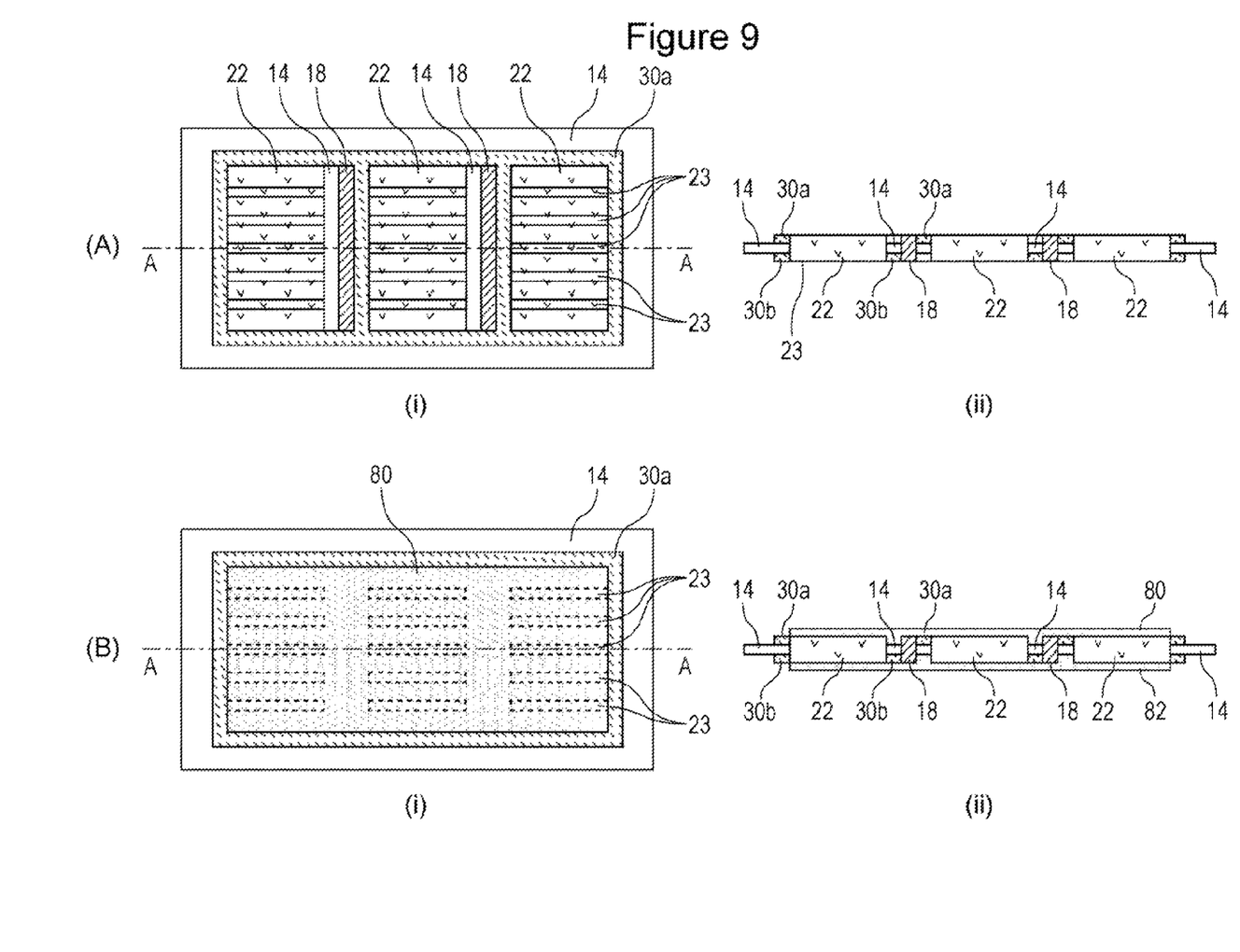
FIG. 9 is a process diagram showing a method for fabricating a composite membrane used in a fuel cell according to the first embodiment.

Next, as shown in FIG. 9(A), the openings 17 (refer to FIG. 7(B)) provided in the substrate 14 are filled with a paste, such as carbon paste. After filling is complete, the paste is dried to form interconnectors 18.

Next, as shown in FIG. 9(B), at the side of one surface of the substrate 14, a catalyst layer 80 is formed along the longitudinal direction of the substrate 14 so as to lie across a plurality of electrolyte membranes 22. Specifically, a catalyst slurry is prepared by sufficiently stirring 10 g of water, 5 g of a Nafion solution, 5 g of platinum black or platinum-supported carbon, and 5 g of 1-propanol, and the catalyst layer 80 is formed by spray coating of the catalyst slurry. Similarly, at the side of the other principal surface of the substrate 14, a catalyst layer 82 is formed along the longitudinal direction of the substrate 14 so as to lie across a plurality of electrolyte membranes 22. Specifically, the catalyst layer 82 is formed by spray coating of the catalyst slurry described above.

Figure 10:
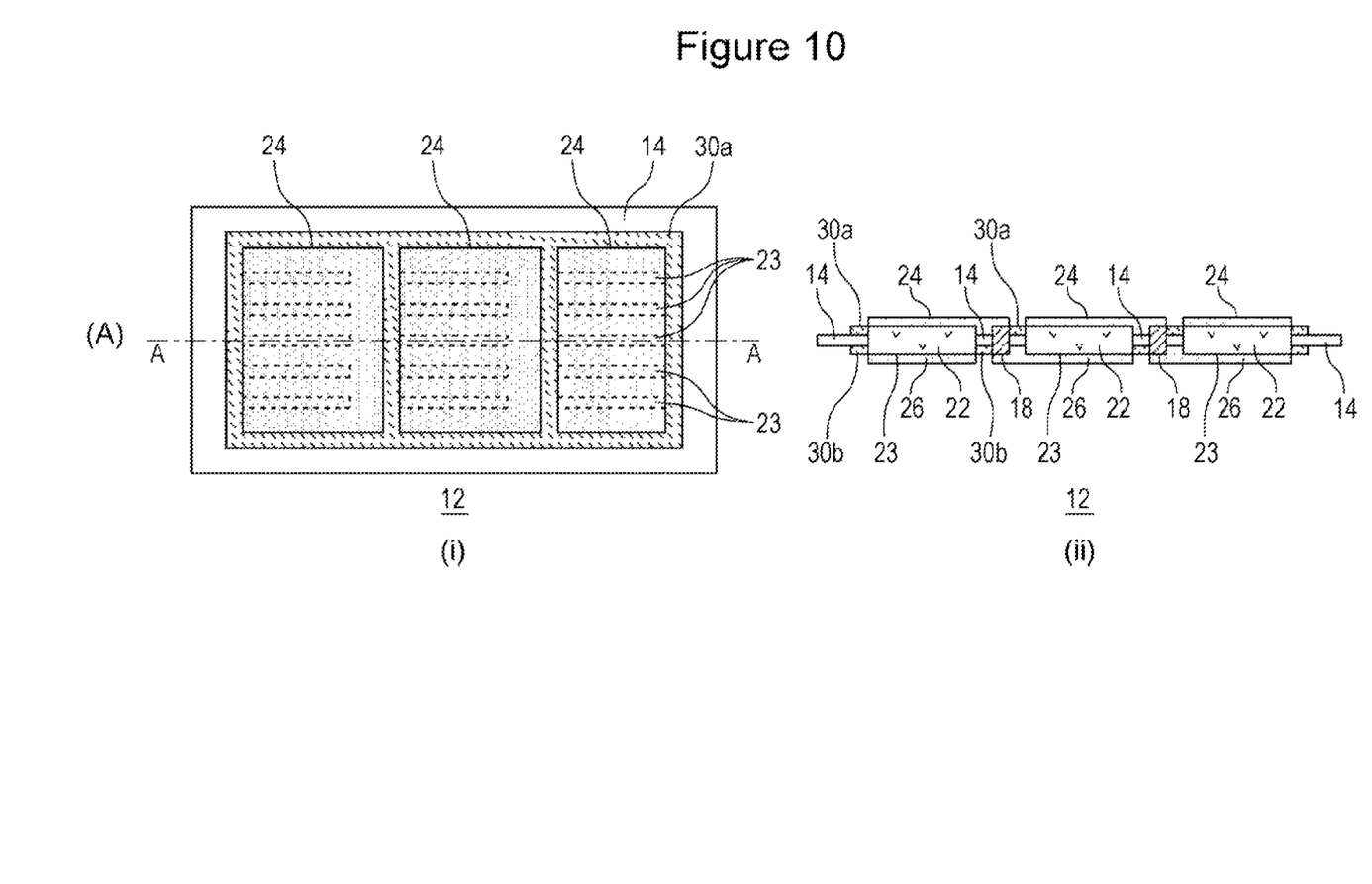
FIG. 10 is a process diagram showing a method for fabricating a composite membrane used in a fuel cell according to the first embodiment.

Next, as shown in FIG. 10(A), predetermined regions of the catalyst layer 80 at the side of one surface of the substrate 14, namely, the regions of the catalyst layer 80 corresponding to the protective layer 30a located in regions lying between the adjacent electrolyte membranes 22, are partially removed using a laser such as an excimer laser. (The width of the predetermined regions of the catalyst layer 80 to be removed is 1 to 500 μm, preferably 50 to 200 μm.) Since the catalyst layer 80 is divided, the protective layer 30a is exposed in the regions lying between the adjacent electrolyte membranes 22, and thereby, anode catalyst layers 24 are formed.

Furthermore, predetermined regions of the catalyst layer 82 at the side of the other surface of the substrate 14, namely, the regions of the catalyst layer 82 corresponding to the protective layer 30b located in regions lying between the adjacent electrolyte membranes 22, are partially removed using a laser such as an excimer laser. (The width of the predetermined regions of the catalyst layer 82 to be removed is 1 to 500 μm, preferably 50 to 200 μm.) Since the catalyst layer 82 is divided, the protective layer 30b is exposed in the regions lying between the adjacent electrolyte membranes 22, and thereby, cathode catalyst layers 26 are formed.

As the laser used for the removal of the catalyst layers, instead of the excimer laser, a YAG third harmonic laser, a $YVO_4$ fourth harmonic green laser, or the like whose oscillation wavelength is 180 to 550 nm may be used. The output of the laser is set to a sufficient level that allows complete removal of the regions of the catalyst layers irradiated with the laser. The output of the laser may be adjusted appropriately in accordance with the material and thickness of the catalyst layers.

In such a manner, the substrate 14 is protected by the protective layer 30a when the catalyst layer 80 is partially removed by the laser processing. Thus, the substrate 14 can be suppressed from being degraded. The substrate 14 is also protected by the protective layer 30b when the catalyst layer 82 is partially removed by the laser processing. Thus, the substrate 14 can be suppressed from being degraded.

Through the manufacturing steps described above, the composite membrane 12 into which the membrane electrode assemblies 20 are incorporated according to the first embodiment is fabricated. In the manufacturing steps described above, after the anode and the cathode are subjected to the similar process in each step, a subsequent step is carried out. However, the anode may be subjected to a series of processes and then the cathode may be subjected to a series of processes, for example. Furthermore, the step of forming the protective layer 30 may be carried out after the substrate 14 has been filled in advance with the electrolyte membranes 22.

(Shape of Thick Portions Formed in Electrolyte Membrane)

In the first embodiment, the thick portions 23 of the electrolyte membrane 22 are formed in a linear strip shape. However, the shape of the thick portions 23 is not limited thereto, and the thick portions 23 can have various shapes. In the following embodiments, examples of thick portions 23 to be formed in the electrolyte membrane 22 will be described.

Second Embodiment

Figure 11:
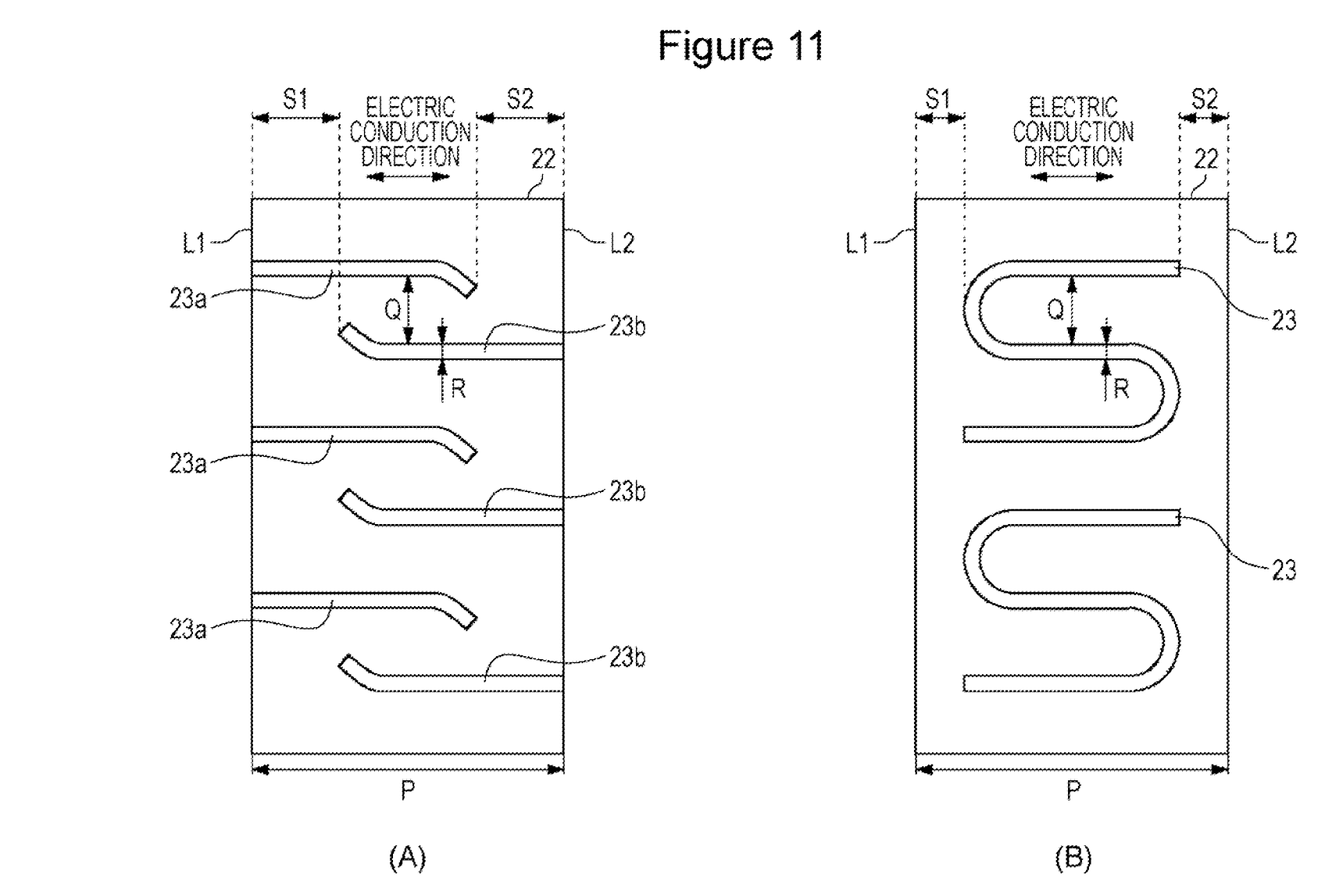
FIG. 11(A) is a plan view showing an electrolyte membrane according to a second embodiment.
FIG. 11(B) is a plan view showing an electrolyte membrane according to the second embodiment.

FIG. 11(A) is a plan view showing an electrolyte membrane 22 according to a second embodiment. In this embodiment, thick portions 23a and thick portions 23b are disposed alternately in a direction perpendicular to the electric conduction direction with a distance therebetween. Each of the thick portions 23a and 23b has a strip shape in which a transverse region extending in the electric conduction direction and a curved region are combined. One end of a thick portion 23a (end of the transverse region) lies at one side L1, which extends in the direction perpendicular to the electric conduction direction, of the electrolyte membrane 22, and the other end of the thick portion 23a (end of the curved region) is separated from the other side L2, which extends in the direction perpendicular to the electric conduction direction, of the electrolyte membrane 22. One end of a thick portion 23b (end of the transverse region) lies at the side L2, and the other end of the thick portion 23b (end of the curved region) is separated from the side L1. Furthermore, the curving direction of the curved region of the thick portion 23a is opposite to the curving direction of the curved region of the thick portion 23b with respect to the direction perpendicular to the electric conduction direction. The distance between the end of the curved region of a thick portion 23a and the transverse region of its adjacent thick portion 23b is smaller than the distance between the transverse region of the thick portion 23a and the transverse region of the thick portion 23b. Furthermore, the distance between the end of the curved region of a thick portion 23b and the transverse region of its adjacent thick portion 23a is smaller than the distance between the transverse region of the thick portion 23a and the transverse region of the thick portion 23b.

Third Embodiment

FIG. 11(B) is a plan view showing an electrolyte membrane 22 according to a third embodiment. In this embodiment, each thick portion 23 has an S shape in which transverse regions and curved regions are combined, and one end thereof is separated from but close to the side L1. The other end of the thick portion 23 is separated from but close to the side L2. The transverse regions of the thick portion 23 are disposed parallel to each other with a predetermined distance therebetween.

Fourth Embodiment

Figure 12:
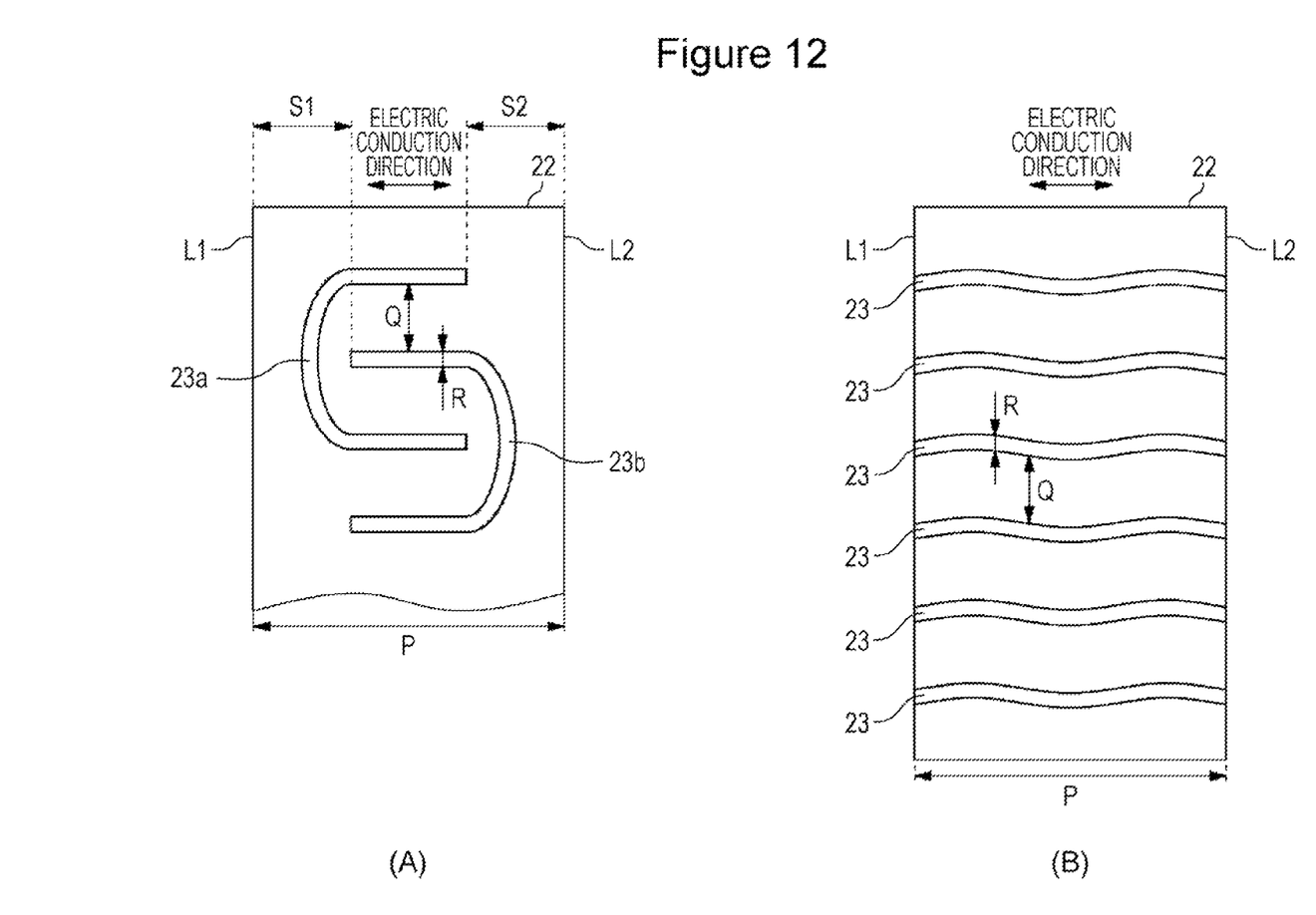
FIG. 12(A) is a plan view showing an electrolyte membrane according to the second embodiment.
FIG. 12(B) is a plan view showing an electrolyte membrane according to the second embodiment.

FIG. 12(A) is a plan view showing an electrolyte membrane 22 according to a fourth embodiment. In this embodiment, a thick portion 23a and a thick portion 23b each have a U shape in which two transverse regions and a curved region are combined. The curved region of the thick portion 23a is separated from but close to the side L1. The two transverse regions of the thick portion 23a extend from the curved region toward the side L2, and the ends of the transverse regions are separated from the side L2. Furthermore, the curved region of the thick portion 23b is separated from but close to the side L2. The two transverse regions of the thick portion 23b extend from the curved region toward the side L1, and the ends of the transverse regions are separated from the side L1. The transverse regions of the thick portion 23a and the transverse regions of the thick portion 23b are disposed so as to be superimposed on each other in the direction perpendicular to the electric conduction direction.

The thick portions 23 according to the second to fourth embodiments differ from those of the first embodiment in that they do not extend from the side L1 to the side L2, they are separated from the side L1 on the side of the side L1 and/or they are separated from the side L2 on the side of the side L2, and the strip-shaped thick portions 23 are curved. As long as the condition that in the plane of the electrolyte membrane 22, the larger of the maximum length S1 from the side L1 to the thick portion 23 and the maximum length S2 from the side L2 to the thick portion 23 is smaller than the smaller of Q and P/3 (max(S1,S2)>min(Q,P/3)) is satisfied and the condition that in the range of S1 to S2 and in the range where the transverse regions of the thick portions 23 are superimposed on each other in the direction perpendicular to the electric conduction direction, as described in the first embodiment, the relationships P/Q>1 and Q/R>1 are satisfied, it is not necessary that the thick portions 23 extend from the side L1 to the side L2, and it is not necessary that the transverse regions of the thick portions 23 be linear. According to the second to fourth embodiments, in comparison with the first embodiment, it is possible to reduce the area occupied by the thick portions 23 in the electrolyte membrane 22. Therefore, the electricity generation performance is less impaired, and the effect of suppressing crack propagation in the electric conduction direction, as described in the first embodiment, can be obtained. Note that the maximum value R in the second to fourth embodiments is defined as the maximum value of the continuous width of the thick portions 23 on a line perpendicular to the electric conduction direction, in the linear region extending in the electric conduction direction.

Fifth Embodiment

FIG. 12(B) is a plan view showing an electrolyte membrane 22 according to a fifth embodiment. The electrolyte membrane 22 of this embodiment is common with that of the first embodiment in that thick portions 23 have a strip shape extending from the side L1 to the side L2, but different from the first embodiment in that the strip-shaped thick portions 23 undulate. As in this case, the thick portions 23 may not necessarily be linear as long as the relationships P/Q>1 and Q/R>1 are satisfied as described in the first embodiment.

The present invention is not limited to the embodiments described above. It is to be understood that various modifications, such as changes in design, may be made on the basis of knowledge of those skilled in the art, and the embodiments in which such modifications are made are also within the scope of the present invention.

For example, in the embodiments described above, cracks having anisotropy due to thick portions 23, in which the ratio of the component in the electric conduction direction is superior to the ratio of the component in the direction perpendicular to the electric conduction direction, are formed in both the anode catalyst layer 24 and the cathode catalyst layer 26. However, the advantages described above can be obtained even in the case where such cracks are formed in either the anode catalyst layer 24 or the cathode catalyst layer 26.

REFERENCE SIGNS LIST 10 fuel cell
12 composite membrane
14 substrate
16 opening
17 opening
18 interconnector
20 membrane electrode assembly
22 electrolyte membrane
23 thick portion
24 anode catalyst layer
26 cathode catalyst layer
30 protective layer
31 opening
37 fuel storage
40 anode housing
42 cathode housing
44 air inlet
50 sealing member
80 catalyst layer
82 catalyst layer

INDUSTRIAL APPLICABILITY

The present invention is applicable in the field of fuel cells.

The invention claimed is:

1. A fuel cell comprising:
a membrane electrode assembly which includes an electrolyte membrane, an anode provided on one surface of the electrolyte membrane, and a cathode provided on another surface of the electrolyte membrane; and
a current-collecting portion provided on a periphery of the membrane electrode assembly,
wherein:
the electrolyte membrane includes thick portions each having a relatively large thickness, and cracks formed in at least one of the anode and the cathode, and
the sum of lengths of components of individual cracks in an electric conduction direction which is toward the current-collecting portion and is an in-plane direction of the electrolyte membrane is larger than the sum of lengths of components of individual cracks in a direction perpendicular to the electric conduction direction.

2. The fuel cell according to claim 1, wherein the thick portions and regions other than the thick portions are disposed alternately in a direction perpendicular to the electric conduction direction on the electrolyte membrane in the plane of the electrolyte membrane.

3. The fuel cell according to claim 2, wherein, in an area where the thick portions and the regions other than the thick portions are alternately disposed in the direction perpendicular to the electric conduction direction on the electrolyte membrane in the plane of the electrolyte membrane, the maximum value Q of the continuous length of the regions other than the thick portions on a line perpendicular to the electric conduction direction is smaller than the length P of the electrolyte membrane in the electric conduction direction.

4. The fuel cell according to claim 3, wherein, in the plane of the electrolyte membrane, the maximum value R of the continuous length of the thick portions on a line perpendicular to the electric conduction direction is smaller than the maximum value Q.

5. The fuel cell according to claim 4, wherein, in the plane of the electrolyte membrane, the thick portions are disposed at a distance from either end in the electric conduction direction, and the maximum value S of the distance between the thick portion and the either end is smaller than the smaller of the maximum value Q and 1/3 of the length P of the electrolyte membrane in the electric conduction direction.

6. A fuel cell comprising:
a membrane electrode assembly which includes an electrolyte membrane, an anode provided on one surface of the electrolyte membrane, and a cathode provided on another surface of the electrolyte membrane; and
a current-collecting portion provided on a periphery of the membrane electrode assembly,
wherein:
the electrolyte membrane includes thick portions each having a relatively large thickness, and cracks formed in at least one of the anode and the cathode,
each of the thick portions extends along an electric conduction direction which is toward the current-collecting portion and is an in-plane direction of the electrolyte membrane, and
the sum of lengths of components of individual cracks in the electric conduction direction is larger than the sum of lengths of components of individual cracks in a direction perpendicular to the electric conduction direction.

7. The fuel cell according to claim 6, wherein each of the thick portions reaches both ends of the electrolyte membrane in the electric conduction direction.

8. The fuel cell according to claim 6, wherein the thick portions and regions other than the thick portions are disposed alternately in a direction perpendicular to the electric conduction direction on the electrolyte membrane in the plane of the electrolyte membrane.

9. The fuel cell according to claim 8, wherein, in an area where the thick portions and the regions other than the thick portions are alternately disposed in the direction perpendicular to the electric conduction direction on the electrolyte membrane in the plane of the electrolyte membrane, the maximum value Q of the continuous length of the regions other than the thick portions on a line perpendicular to the electric conduction direction is smaller than the length P of the electrolyte membrane in the electric conduction direction.

10. The fuel cell according to claim 9, wherein, in the plane of the electrolyte membrane, the maximum value R of the continuous length of the thick portions on a line perpendicular to the electric conduction direction is smaller than the maximum value Q.

11. The fuel cell according to claim 10, wherein, in the plane of the electrolyte membrane, the thick portions are disposed at a distance from either end in the electric conduction direction, and the maximum value S of the distance between the thick portion and the either end is smaller than the smaller of the maximum value Q and 1/3 of the length P of the electrolyte membrane in the electric conduction direction.

* * * * *